United States Patent
Cook et al.

[11] Patent Number: 5,533,488
[45] Date of Patent: Jul. 9, 1996

[54] VACUUM SUSTAINING VALVE

[75] Inventors: John E. Cook; Paul D. Perry, both of Chatham, Canada

[73] Assignee: Siemens Electric Ltd., Ontario, Canada

[21] Appl. No.: 391,393

[22] Filed: Feb. 27, 1995

[51] Int. Cl.⁶ .......................... F02M 25/07; G05D 16/06
[52] U.S. Cl. ............................................. 123/568; 137/907
[58] Field of Search ...................... 123/407, 409, 123/568, 569, 570, 571; 137/116.3, 103, 907

[56] References Cited

U.S. PATENT DOCUMENTS

| 4,030,460 | 6/1977 | Tanaka et al. | 123/407 |
|---|---|---|---|
| 4,100,894 | 7/1978 | Tamura | 123/409 |
| 4,195,605 | 4/1980 | Weathers et al. | 123/568 |
| 4,241,751 | 12/1980 | Nonoyama et al. | 123/409 X |
| 4,267,809 | 5/1981 | Mase et al. | 123/409 |
| 4,651,766 | 3/1987 | Ransom | 123/568 X |

Primary Examiner—Willis R. Wolfe

[57] ABSTRACT

A vacuum sustaining valve (VSV) for temporarily sustaining at least some engine intake manifold vacuum to an EGR valve when engine intake manifold vacuum falls below a predetermined value. The VSV has an inlet port, an outlet port, and a flow path between the two ports. A check valve is disposed with the flow path and is selectively positioned in accordance with manifold vacuum. When manifold vacuum is above a predetermined magnitude, the check valve is positioned to allow bi-directional flow between the two ports. When manifold vacuum is below the predetermined magnitude, the check valve is positioned to function as a check that allows vacuum to pass from the inlet port to the outlet port, but not in the opposite direction.

22 Claims, 1 Drawing Sheet

TO INTAKE
MANIFOLD
VACUUM

VACUUM SUSTAINING VALVE

FIELD OF THE INVENTION

This invention relates generally to valves, and in particular to a vacuum sustaining valve for temporarily sustaining at least some vacuum to a vacuum actuated device when the magnitude of vacuum from a variable vacuum source drops below a predetermined value. The valve is particularly useful in a vacuum actuated EGR system of an automotive vehicle's internal combustion engine.

BACKGROUND AND SUMMARY OF THE INVENTION

EGR (exhaust gas recirculation) is used in automotive vehicle internal combustion engines for exhaust emission control. One type of EGR valve is vacuum operated, being controlled by vacuum delivered from an EVR (electric vacuum regulator) valve. The latter valve is controlled by the engine ECU (electronic control unit) to provide the appropriate amount of vacuum to the EGR valve. The EVR valve inlet port is communicated to engine manifold vacuum, and its outlet port to the vacuum inlet port of the EGR valve.

Intake manifold vacuum is not constant, but can vary significantly as the engine is operated. During periods of low intake manifold vacuum, the EVR valve is unable to maintain adequate levels of vacuum for proper control of the EGR valve, and as a consequence, emission infractions may occur.

The present invention relates to a vacuum sustaining valve that maintains a slowly declining vacuum input to the EGR valve during such periods of low manifold vacuum toward the objective of avoiding such infractions. If low manifold vacuum persists for an extended time, the vacuum sustaining valve will eventually bleed off to atmosphere the vacuum input to the EGR valve, shutting down EGR operation altogether.

The foregoing, along with further features, advantages, and benefits of the invention, will be seen in the ensuing description and claims, which are accompanied by a drawing. The drawing discloses a presently preferred embodiment of the invention according to the best mode contemplated at this time for carrying out the invention.

DESCRIPTION OF THE PREFERRED EMBODIMENT

Figure 1:
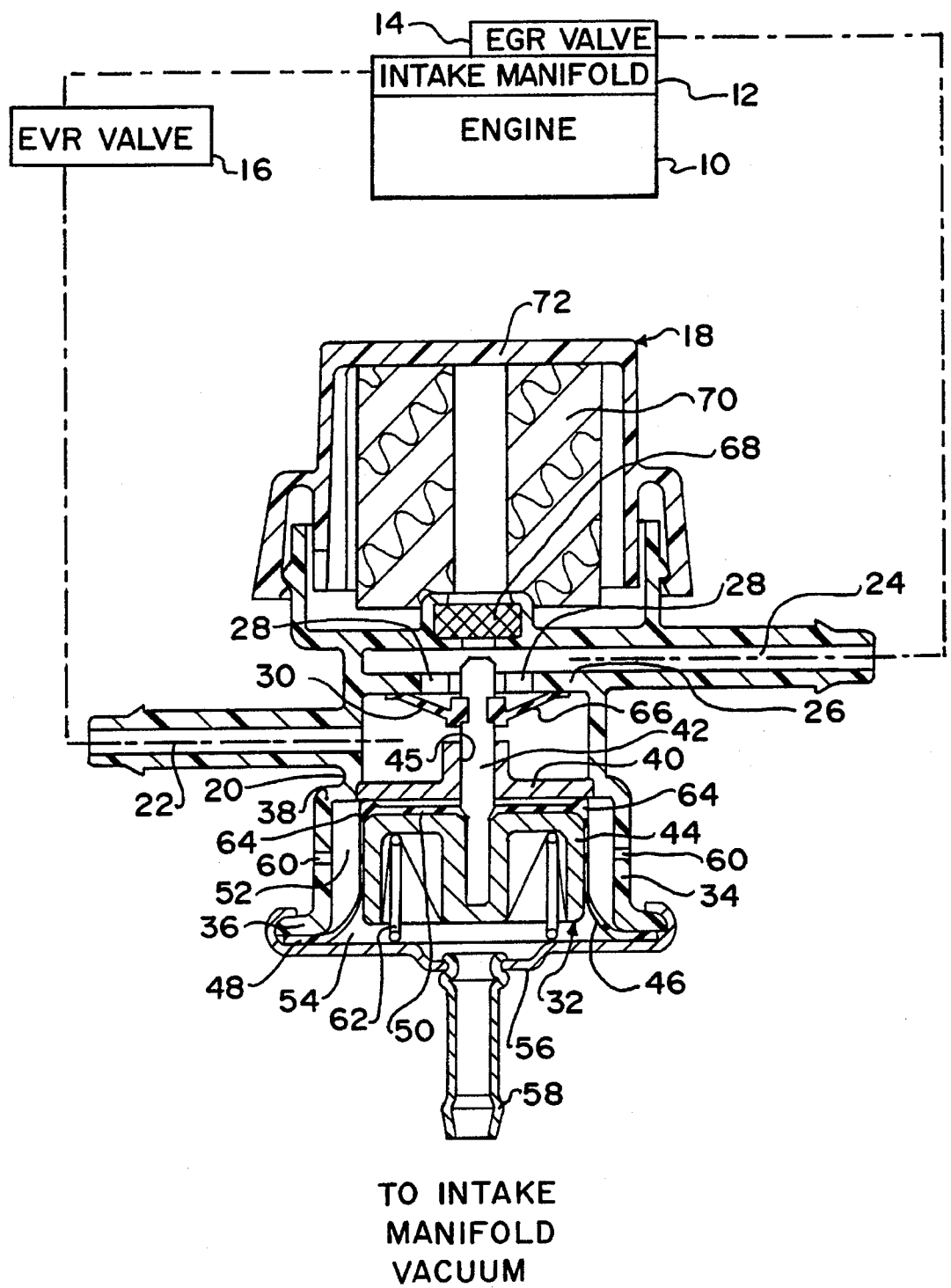
FIG. 1 is a vertical cross section through a vacuum sustaining valve embodying principles of the invention, and illustrating schematically its association with an internal combustion engine EGR system.

FIG. 1 shows: an internal combustion engine 10 having an intake manifold 12; and an EGR system that comprises an EGR valve 14, an EVR valve 16, and a vacuum sustaining valve (VSV) 18 embodying principles of the invention. EVR valve 16 is under the control of the engine ECU (not shown) and comprises an inlet port that is communicated to intake manifold vacuum and an outlet port that is communicated to valve 18. EGR valve 14 has a vacuum inlet control port that is communicated to valve 18.

Valve 18 comprises a housing 20 having an inlet port 22 and an outlet port 24, both in the form of barbed nipples for reception of respective vacuum conduits to EVR valve 16 and to EGR valve 14 respectively, and a flow path through the housing between ports 22, 24. Housing 20 further comprises an internal wall 26 that is transverse to the flow path, but contains one or more through-apertures 28 providing for flow to pass between ports 22 and 24.

Valve 18 further comprises an umbrella-type check valve element 30 that is disposed within the flow path and is selectively positionable within housing 20: to a first position (the position illustrated in FIG. 1) where it functions as a check to disallow vacuum passage from outlet port 24 to inlet port 22 when the magnitude of vacuum at outlet port 24 exceeds that at inlet port 22 and to allow vacuum passage from inlet port 22 to outlet port 24 when the magnitude of vacuum at inlet port 22 exceeds that at outlet port 24 by an amount capable of operating the check valve element to allow such vacuum passage; and to a second position (not illustrated in FIG. 1) where it allows bi-directional flow between the two ports 22, 24.

Valve 18 still further comprises an actuator designated generally at 32 for selectively positioning check valve element 30 between its first and second positions. Housing 20 comprises a cylinder 34 having an outer axial end 36 and an inner axial end 38. A bearing member 40 is disposed across inner axial end 38 to close off that inner axial end. Actuator 32 comprises a selectively linearly positionable portion comprising a shaft 42 and a piston 44. Bearing member 40 has a bearing hole 45 through which shaft 42 passes for linearly guiding the shaft/piston motion. Check valve element 30 is disposed on shaft 42, being located between wall 26 and bearing hole 45. Actuator 32 further comprises a diaphragm 46 having an outer circumferentially extending margin 48 that is sealed to axial end 36 of cylinder 34 and an inner portion 50 that is sealed to piston 44.

Diaphragm 46 divides cylinder 34 into first and second chambers 52, 54, with chamber 52 being to that side of diaphragm 46 that is toward bearing member 40, and chamber 54 being to the opposite side of the diaphragm. A cover 56 closes end 36 of cylinder 34 by having its outer margin crimped onto the cylinder end, capturing margin 48 of diaphragm 46 in the process. A vacuum port 58, in the form of a nipple of cover 56, provides for communicating chamber 54 to intake manifold vacuum. One or more vent openings 60 in the sidewall of cylinder 34 provide for communicating chamber 52 to atmosphere. A helical coil spring 62 is disposed between cover 56 and piston 44 for resiliently biasing the piston toward bearing member 40.

The position shown by FIG. 1 is representative of a condition of low manifold vacuum where the vacuum supplied to chamber 54 is insufficient to overcome the bias of spring 62 so that as a consequence, the outer perimeter margin of check valve element 30 is sealed against wall 26 in surrounding relation to through-apertures 28. Check valve element will now function as a check to disallow vacuum passage from outlet port 24 to inlet port 22 when the magnitude of vacuum at outlet port 24 exceeds that at inlet port 22 and to allow vacuum passage from the inlet port to the outlet port when the magnitude of vacuum at the inlet port exceeds that at the outlet port by an amount capable of operating the check valve element to allow such vacuum passage.

When the vacuum supplied to chamber 54 is sufficient to overcome the bias of spring 62, piston 44 and shaft 42 will be displaced downward to a position where the outer perimeter margin of check valve element 30 is unsealed from wall 26. In this position of check valve element 30, through-apertures 28 allow bi-directional flow between ports 22, 24.

Diaphragm 46 comprises a circular perimeter sealing ridge 64 for sealing engagement with bearing member 40 when valve 18 is in the position shown in FIG. 1. This sealing is in surrounding relation to the end of bearing hole 45 that is toward chamber 52 so as to seal between shaft 42 and the bearing hole when the check valve element is in the FIG. 1 position. This seal prevents vacuum from EVR valve 16 from leaking to atmosphere. When valve 18 is operated to unseal the check valve element from wall 26, the seal provided by ridge 64 will be broken, but re-sealing will occur when an integral perimeter sealing formation 66 of the check valve element abuts the upper end of bearing member 40 around hole 45.

Valve 18 also comprises a restrictor 68 disposed on housing 20 at a location between outlet port 24 and check valve element 30 for providing restricted communication to atmosphere. The restrictor provides an atmospheric bleed for restrictively bleeding vacuum to atmosphere. The communication takes place through a filter cartridge 70 that is held in place on housing 20 by a cap 72.

So long as intake manifold vacuum is above a predetermined magnitude, check valve element 30 will be pulled down and away from sealing against wall 26. When intake manifold vacuum falls below that predetermined magnitude, actuator 32 will displace piston 44 and shaft 42 upwardly to a position where the check valve element can function as a check with respect to the relative vacuums at ports 22, 24. The check will close through-apertures 28 to trap whatever vacuum exists at outlet port 24, subject to gradual bleeding of the trapped vacuum to atmosphere via restrictor 68. Should the vacuum at inlet port 22 increase sufficiently to unseat the check, that increase will be conveyed through the unseated check to the outlet port. In the absence of such increase, the vacuum at outlet port 24 will eventually be entirely bled to atmosphere.

While a presently preferred embodiment of the invention has been illustrated and described, it is to be appreciated that the principles may be practiced in other equivalent ways within the scope of the following claims.

What is claimed is:

1. A vacuum sustaining valve for temporarily sustaining at least some vacuum to a vacuum-actuated device when vacuum from a variable vacuum source falls below a predetermined value, said valve comprising:

a housing comprising an inlet port adapted to be communicated to a variable vacuum source, an outlet port adapted to be communicated to a vacuum-actuated device, and a flow path through said housing between said ports;

a check valve element that is disposed within said flow path and is selectively bodily positionable within said housing to a first position where it functions as a check to disallow vacuum passage from said outlet port to said inlet port when the magnitude of vacuum at said outlet port exceeds that at said inlet port and to allow vacuum passage from said inlet port to said outlet port when the magnitude of vacuum at said inlet port exceeds that at said outlet port by an amount capable of operating the check valve element to allow such vacuum passage, and to a second position, spaced from said first position, where it allows bi-directional flow between said ports;

and actuator means responsive to the magnitude of vacuum of such a variable vacuum source for bodily positioning said check valve element to its first position when the magnitude of vacuum of such variable vacuum source is below a predetermined value and for bodily positioning said check valve element to its second position when the magnitude of vacuum of such variable vacuum source is above such predetermined value.

2. A vacuum sustaining valve as set forth in claim 1 in which said housing comprises an atmospheric bleed having communication with said flow path at a location between said outlet port and said check valve element for restrictively bleeding vacuum to atmosphere.

3. A vacuum sustaining valve as set forth in claim 1 in which said housing comprises an internal wall that is transverse to said flow path and contains through-aperture means providing for said flow path to pass through said wall, and in which said check valve element is an umbrella-type check valve element comprising a body having a circumferentially extending perimeter, said perimeter comprising a circumferentially extending sealing surface that seals against said wall in surrounding relation to said through-aperture means when said check valve element is in its first position and the magnitude of vacuum at said inlet port does not exceed that at said outlet port by an amount sufficient to operate said check valve element.

4. A vacuum sustaining valve as set forth in claim 3 in which said actuator means comprises a selectively linearly positionable portion, including a shaft, and said body of said check valve element is disposed on said shaft such that said check valve element is selectively positioned to its first and second positions by the selective linear positioning of said selectively linearly positionable portion.

5. A vacuum sustaining valve as set forth in claim 4 in which said housing comprises a bearing member having a bearing hole through which said shaft passes, said check valve element being located between said wall and said bearing hole, and perimeter sealing means disposed on said shaft for engagement with said bearing member, when said check valve element is in its second position, in surrounding relation to an end of said bearing hole that is toward said check valve element so as to seal between said shaft and said bearing hole when said check valve element is in its second position.

6. A vacuum sustaining valve as set forth in claim 5 in which said perimeter sealing means is a integral formation of said umbrella check valve element.

7. A vacuum sustaining valve as set forth in claim 5 in which another perimeter sealing means is disposed on said selectively linearly positionable portion for engagement with said bearing member, when said check valve element is in its first position, in surrounding relation to another end of said bearing hole opposite said first-mentioned end so as to seal between said shaft and said bearing hole when said check valve element is in its first position.

8. A vacuum sustaining valve as set forth in claim 7 in which said selectively linearly positionable portion comprises a piston, said housing comprises a cylinder within which said piston is disposed, said bearing member bounds one axial end of said cylinder, said actuator means comprises a diaphragm having an outer circumferentially extending margin that is sealed to another axial end of said cylinder opposite said one axial end of said cylinder and an inner portion that is sealed to said piston, and said another perimeter sealing means is an integral formation of said diaphragm.

9. A vacuum sustaining valve as set forth in claim 8 in which said diaphragm divides said cylinder into first and second chambers, said first chamber being to that side of said diaphragm that is toward said bearing member, and said second chamber being to an opposite side of said diaphragm, a cover closing said another axial end of said cylinder, a vacuum port for communicating said second chamber to such a vacuum source, and a vent opening for communicating said first chamber to atmosphere.

10. A vacuum sustaining valve as set forth in claim 9 in which said cover is crimped onto said another axial end of said cylinder and captures said outer circumferentially extending margin of said diaphragm.

11. A vacuum sustaining valve as set forth in claim 9 in which a resilient spring means resiliently biases said piston toward said bearing member.

12. A vacuum sustaining valve as set forth in claim 1 in which said actuator means comprises a vacuum actuator comprising a linearly positionable piston, said housing comprises a cylinder within which said piston is disposed, a diaphragm having an outer circumferentially extending margin that is sealed to an axially outer end of said cylinder and an inner portion that is sealed to said piston, said diaphragm dividing said cylinder into first and second chambers, a cover closing said outer axial end of said cylinder to enclose said second chamber, a vacuum port for communicating said second chamber to such a vacuum source, and a vent opening for communicating said first chamber to atmosphere.

13. A vacuum sustaining valve as set forth in claim 12 in which a resilient spring means resiliently biases said piston away from said cover.

14. In an internal combustion engine, an engine intake manifold vacuum sustaining valve for temporarily sustaining at least some engine intake manifold vacuum to a vacuum-actuated device when engine intake manifold vacuum falls below a predetermined value, said valve comprising:

a housing comprising an inlet port communicated to engine intake manifold vacuum, an outlet port communicated to a vacuum-actuated device, and a flow path through said housing between said ports;

a check valve element that is disposed within said flow path and is selectively bodily positionable within said housing to a first position where it functions as a check to disallow vacuum passage from said outlet port to said inlet port when the magnitude of vacuum at said outlet port exceeds that at said inlet port and to allow vacuum passage from said inlet port to said outlet port when the magnitude of vacuum at said inlet port exceeds that at said outlet port by an amount capable of operating the check valve element to allow such vacuum passage, and to a second position, spaced from said first position, where it allows bi-directional flow between said ports;

and actuator means responsive to the magnitude of engine intake manifold vacuum for bodily positioning said check valve element to its first position when the magnitude of intake manifold vacuum is below a predetermined value and for bodily positioning said check valve element to its second position when the magnitude of intake manifold vacuum of is above such predetermined value.

15. In an internal combustion engine, an engine intake manifold vacuum sustaining valve as set forth in claim 14 in which said housing comprises an atmospheric bleed having communication with said flow path at a location between said outlet port and said check valve element for restrictively bleeding vacuum to atmosphere.

16. In an internal combustion engine, an engine intake manifold vacuum sustaining valve as set forth in claim 14 in which said housing comprises an internal wall that is transverse to said flow path and contains through-aperture means providing for said flow path to pass through said wall, and in which said check valve element comprises a body having a circumferentially extending perimeter, said perimeter comprising a circumferentially extending sealing surface that seals against said wall in surrounding relation to said through-aperture means when said check valve element is in its first position and the magnitude of vacuum at said inlet port does not exceed that at said outlet port by an amount sufficient to operate said check valve element.

17. In an internal combustion engine, an engine intake manifold vacuum sustaining valve as set forth in claim 16 in which said actuator means comprises a selectively linearly positionable portion, including a shaft, said body of said check valve element is disposed on said shaft such that said check valve element is selectively positioned to its first and second positions by the selective linear positioning of said selectively linearly positionable portion, said housing comprises a bearing member having a bearing hole through which said shaft passes, said check valve element being located between said wall and said bearing hole, and perimeter sealing means disposed on said shaft for engagement with said bearing member, when said check valve element is in its second position, in surrounding relation to an end of said bearing hole that is toward said check valve element so as to seal between said shaft and said bearing hole when said check valve element is in its second position.

18. In an internal combustion engine, an engine intake manifold vacuum sustaining valve as set forth in claim 17 in which another perimeter sealing means is disposed on said selectively linearly positionable portion for engagement with said bearing member, when said check valve element is in its first position, in surrounding relation to another end of said bearing hole opposite said first-mentioned end so as to seal between said shaft and said bearing hole when said check valve element is in its first position.

19. In an internal combustion engine, an engine intake manifold vacuum sustaining valve as set forth in claim 18 in which said selectively linearly positionable portion comprises a piston, said housing comprises a cylinder within which said piston is disposed, said bearing member bounds one axial end of said cylinder, said actuator means comprises a diaphragm having an outer circumferentially extending margin that is sealed to another axial end of said cylinder opposite said one axial end of said cylinder and an inner portion that is sealed to said piston, said diaphragm divides said cylinder into first and second chambers, said first chamber being to that side of said diaphragm that is toward said bearing member, and said second chamber being to an opposite side of said diaphragm, a cover closing said another axial end of said cylinder, a vacuum port for communicating said second chamber to engine intake manifold vacuum, and a vent opening for communicating said first chamber to atmosphere.

20. In an internal combustion engine having an EGR system including a vacuum-operated EGR valve that is controlled by an EVR valve, the improvement which comprises a vacuum sustaining valve disposed to open and thereby transmit vacuum from said EVR valve to said EGR valve so long as the magnitude of intake manifold vacuum is above a predetermined level, and to close and thereby trap whatever vacuum is being supplied to said EGR valve when the magnitude of intake manifold vacuum drops below said predetermined level.

21. A vacuum sustaining valve for temporarily sustaining at least some vacuum to a vacuum-actuated device when vacuum from a variable vacuum source falls below a predetermined value, said valve comprising:

a housing comprising an inlet port adapted to be communicated to a variable vacuum source, an outlet port adapted to be communicated to a vacuum-actuated device, and a flow path through said housing between said ports;

a check valve means that is disposed within said flow path and that comprises an element that is selectively bodily positionable within said housing to a first position where said check valve means functions as a check to disallow vacuum passage from said outlet port to said inlet port when the magnitude of vacuum at said outlet port exceeds that at said inlet port and to allow vacuum passage from said inlet port to said outlet port when the magnitude of vacuum at said inlet port exceeds that at said outlet port by an amount capable of operating said check valve means to allow such vacuum passage, and to a second position that is spaced from said first position and allows bi-directional flow between said ports;

and actuator means responsive to the magnitude of vacuum of such a variable vacuum source for bodily positioning said check valve element to its first position when the magnitude of vacuum of such variable vacuum source is below a predetermined value and for bodily positioning said check valve element to its second position when the magnitude of vacuum of such variable vacuum source is above such predetermined value.

22. In an internal combustion engine, an engine intake manifold vacuum sustaining valve for temporarily sustaining at least some engine intake manifold vacuum to a vacuum-actuated device when engine intake manifold vacuum falls below a predetermined value, said valve comprising:

a housing comprising an inlet port communicated to engine intake manifold vacuum, an outlet port communicated to a vacuum-actuated device, and a flow path through said housing between said ports;

a check valve means that is disposed within said flow path and that comprises an element that is selectively bodily positionable within said housing to a first position where said check valve means functions as a check to disallow vacuum passage from said outlet port to said inlet port when the magnitude of vacuum at said outlet port exceeds that at said inlet port and to allow vacuum passage from said inlet port to said outlet port when the magnitude of vacuum at said inlet port exceeds that at said outlet port by an amount capable of operating said check valve means to allow such vacuum passage, and to a second position that is spaced from said first position and allows bi-directional flow between said ports;

and actuator means responsive to the magnitude of engine intake manifold vacuum for bodily positioning said check valve element to its first position when the magnitude of intake manifold vacuum is below a predetermined value and for bodily positioning said check valve element to its second position when the magnitude of intake manifold vacuum of is above such predetermined value.

\* \* \* \* \*